Oct. 14, 1941.  H. W. LINDENMUTH  2,259,385
RECIPROCATING SLEEVE
Filed May 27, 1940  2 Sheets-Sheet 1
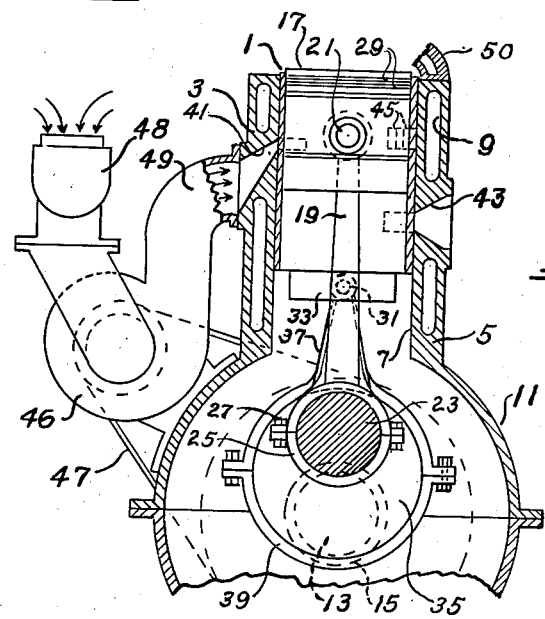
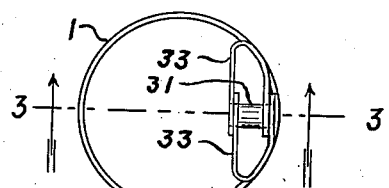
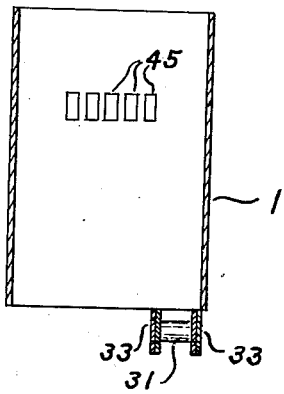
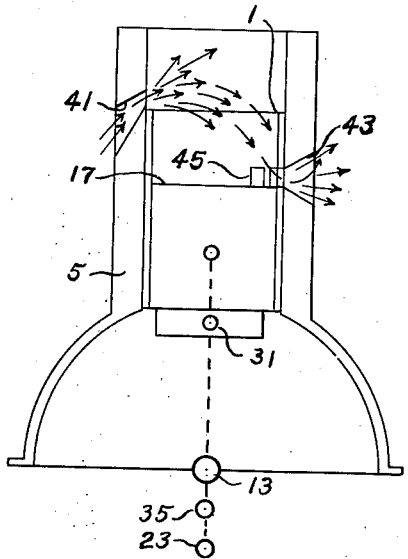
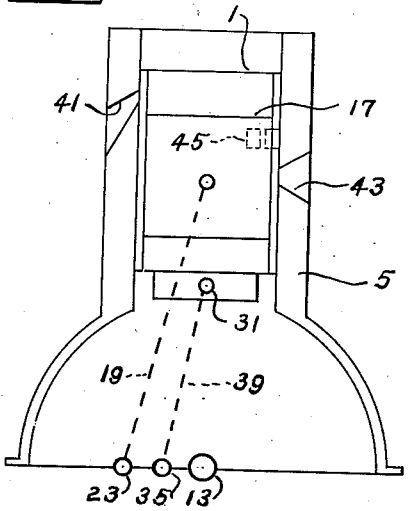
INVENTOR.
Henry W. Lindenmuth
BY
HIS ATTORNEY Oct. 14, 1941.    H. W. LINDENMUTH    2,259,385
RECIPROCATING SLEEVE
Filed May 27, 1940    2 Sheets-Sheet 2

INVENTOR.
BY Henry W. Lindenmuth
HIS ATTORNEY

Patented Oct. 14, 1941

2,259,385

UNITED STATES PATENT OFFICE 2,259,385

RECIPROCATING SLEEVE

Henry W. Lindenmuth, Dearborn, Mich.

Application May 27, 1940, Serial No. 337,398

9 Claims. (Cl. 123—65)

My invention pertains to friction and wear reducing sliding sleeves and also to driving means for such sleeves in internal combustion engines and similar apparatus, and more particularly my invention relates to an improved internal combustion engine.

It is an object of my invention to provide a friction and wear reducing sleeve disposed and movable between a piston and the cylinder walls in an internal combustion engine, or similar apparatus, in a suitable manner for reducing the piston friction.

It is also an object of my invention to provide such a friction reducing sleeve of a length approximately the length of the piston plus one half the stroke of the piston and driving means so arranged in combination therewith that the sleeve moves simultaneously in the same direction with the piston, moving through substantially half the distance of the piston stroke at substantially half the average speed of the piston.

It is a further object of my invention to provide an improved internal combustion engine comprising such a friction reducing sleeve which also is ported to serve further as valve means for the engine in a simplified two-cycle engine, which may be advantageously used in combination with a source of fuel under pressure.

Another object of my invention is to provide a simple and compact sleeve driving mechanism comprising a race ring secured to one end of the sleeve and extending therefrom adjacent the side of the connecting rod and a pin projecting from the side of the connecting rod into the race ring.

Further objects and advantages are within the scope of my invention such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of my invention, in which:

Fig. 1 is a transverse sectional view showing a two cycle internal combustion engine partially broken away and having a sliding sleeve arranged in accordance with my invention to reduce friction and also to serve as valves, the sleeve being sectioned and the piston shown in elevation in the firing position;

Fig. 2 is an enlarged bottom plan view of the friction reducing sleeve;

Fig. 3 is an axial sectional view taken on line 3—3 of Fig. 2;

Fig. 4 is a sectional view of the engine similar to Fig. 1 but showing the piston, the friction reducing sleeve with the connecting rods diagrammatically represented at the half stroke position;

Fig. 5 is a similar view showing the moving parts in down position with the valves open;

Figure 6:
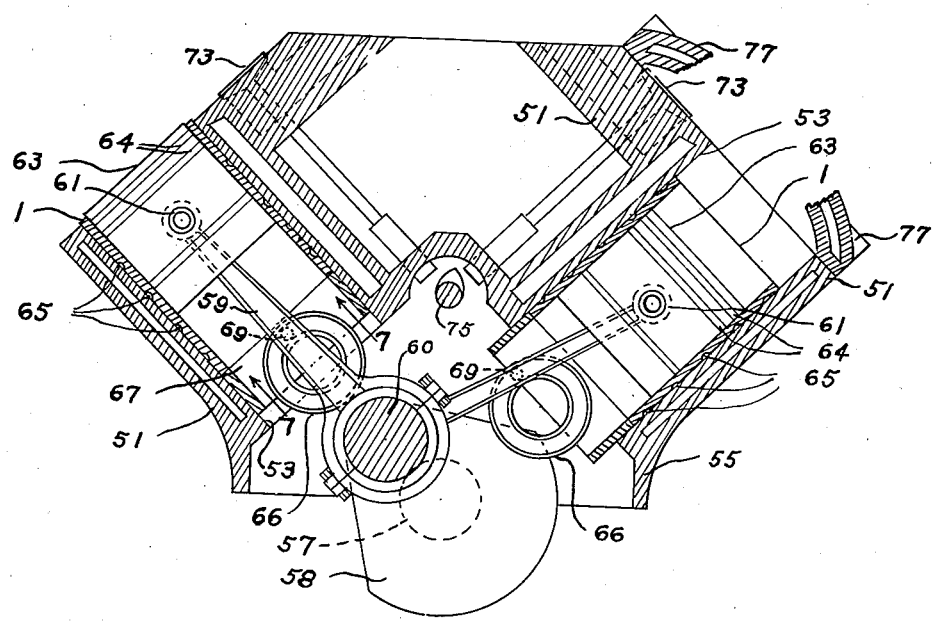
Fig. 6 is a transverse sectional view of another embodiment of my invention being a V-type four cycle internal combustion engine having my friction reducing sleeves driven by an improved simple and compact driving arrangement.

Referring more particularly to Figs. 1, 2 and 3 of the drawings, I have shown my friction reducing sleeve 1 operatively installed in an internal combustion engine 3 of the two-cycle type. Such an engine usually comprises a cylinder block 5 having one or more cylinder bores 7 therein and surrounded by passages 9 for circulating a cooling medium, in a well known manner. From the lower end of the cylinder block a crank case 11 extends and a crank shaft 13 is journalled in any suitable bearings 15 in the crank case below the lower end of the cylinder bore 7 and transversely to the axis thereof. A piston 17, reciprocally disposed in the cylinder bore 7, is operatively connected to the crank shaft 13 by means of a connecting rod 19 which is pivotally connected to a wrist pin 21 in the piston. The other end of the connecting rod 19 is journalled to a crank 23 of the crank shaft in any usual manner, as by a cap 25 and screws 27.

The piston has the usual piston rings 29 and is of a diameter substantially smaller than the diameter of the cylinder forming an annular space therebetween for receiving the reciprocating friction reducing sleeve 1 to slide between the piston and the side walls of the cylinder bore. The piston rings slide snugly in the sleeve to form a seal, and the outer surfaces of the sleeve may be provided with oil retaining and sealing channels, if desired, although the greater length of the sleeve also facilitates establishing a good seal.

As shown in Figs. 2 and 3, the wear and friction reducing sleeve 1 is provided with a wrist pin 31 which is supported in a transverse position between the ends of a pair of substantially U-shaped brackets 33. The yokes or closed ends of the approximately U-shaped brackets 33 are welded to or are integral with the lower end edges of the sleeve 1 adjacent one side thereof, with the open ends of the brackets projecting together and having aligned openings for receiving the ends of the wrist pin 31, which may be firmly secured as by pressing therein.

The brackets 33 and the pin 31 may be rather light, as but slight power is required to reciprocate the friction reducing sleeve 1. For driving the sleeve 1, an eccentric 35 is provided on the crank shaft adjacent the crank. The eccentric 35 may be quite narrow or thin axially of the shaft because only slight power is required. An eccentric rod 37 is journalled to the eccentric by means of an eccentric strap 39 extending from the eccentric rod 37 around the eccentric in a usual manner. The throw of the eccentric 35 operating the sleeve is substantially less than the throw of the main crank 23, and in the installation shown it has approximately one half of the throw of the main crank for moving the sleeve 1 always in the same direction with the piston but at an average slower velocity to reduce the friction and wear between the relatively moving surfaces which varies as a high function of the relative velocities between such working parts.

Such an arrangement is useful for reducing wear and friction power losses in air compressors and similar machines as well as in internal combustion engines.

When used in a two-cycle internal combustion engine, the friction reducing sleeve 1 may also serve as a valve for controlling the intake and exhaust of gas and combustion products. In such an arrangement, as shown in Fig. 1, a suitably positioned intake port opening 41 is provided opening through the side wall of the cylinder bore at a point which is adjacent the mid-point of the sweep cleared by the upper end of the piston 17 and above the upper end of the sleeve 1 when moved to its lowest position. An exhaust port 43 is provided opening through the side wall of the cylinder bore on the opposite side from the intake and at a point just above the lowest position of the upper end of the piston. An exhaust port 45 is provided opening through the side of said sleeve 1 at a point therein suitable for conductively connecting with the stationary exhaust port 43 when the piston and the sleeve are moved to the lowest position in the cylinder bore.

The intake port 41 in the cylinder bore is preferably connected to a source of fuel gas under pressure to inject fuel gas therein to charge the cylinder and to aid in scavenging the cylinder when the piston 17 and the sleeve 1 are in the lowermost positions. For a suitable source of fuel under pressure the engine may be provided with any conventional high pressure supercharger 46 driven from the crank-shaft 13 through any suitable mechanical transmission 47 in a usual manner, for drawing a proper combustible mixture from a carburetor 48 and forcing it into the intake of the engine through an interconnected conduit 49. A cylinder head 50 is secured on the upper end of the cylinder block to close the bore and form combustion chamber in a well known manner. A spark plug (not shown) on the cylinder head may be connected with a conventional ignition system for firing the charges in a well known manner.

Also the engine may be connected with any other suitable source of fuel under pressure, instead of using a supercharger, if desired, and in injection type engines, air under pressure may be supplied from the source, the fuel being separately injected. Although I have previously shown and described my friction and wear reducing sleeve arrangement in a vertical installation, it is to be understood that my invention may also be installed and used advantageously in horizontally disposed cylinders or in cylinders disposed in a V-relation. In this simplified two-cycle engine the loss of power by friction is reduced to a minimum, wear is minimized, and the maximum amount of power is available on the crank shaft to be delivered for useful applications.

Figure 7:
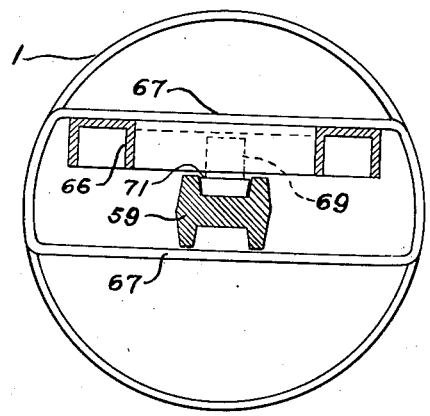
Fig. 7 is an enlarged sectional view taken on line 7—7 of Fig. 6 to more clearly show the improved sleeve driving mechanism.

In Figs. 6 and 7, a V-type internal combustion engine is shown comprising cylinder blocks 51 which may be either separate or integral and which have cylinder bores 53 disposed in a V-relation, and a crank case portion 55 projecting downwardly therefrom, to be closed by a lower crank case portion (not shown) and mounted in any well known manner. A crank shaft 57 having usual counter weights 58 is journalled in the crank case to operatively connect with connecting rods 59 which are pivotally attached from crank 60 to wrist pins 61 in pistons 63 disposed to reciprocate in the cylinder bores. Each piston 63 is substantially smaller in diameter than its cylinder bore 53 and in the annular space between each piston and the walls of the cylinder bore is disposed a friction reducing sleeve 1, of a suitable diameter and thickness to slide freely therebetween. Each piston has suitable piston rings 64 which engage the inside surface of the adjacent sleeve 1 to make a sealed contact. The outer surface of each sleeve 1 is preferably provided with circumferential grooves 65 for a similar purpose, or rings may be used.

Various lengths of the friction reducing sleeve 1 may be used but it is preferable to make the sleeve of a length which is approximately equal to the length of the piston plus half a piston stroke, and to move it in either same direction simultaneously with the piston but at substantially half the average velocity of the piston. In this manner the relative velocity of the engaging surfaces between the friction reducing sleeve and the piston and the cylinder bore is reduced to about half. At high speeds this provides a very great saving in power loss and in wear caused by friction because such losses vary as a high function of the relative velocities of the rubbing surfaces.

For driving each sleeve 1 in either or the same direction with the adjacent piston and at a suitable relative velocity, I provide a race ring 66 which is of channel cross section open on one side. The race ring 66 is secured to the lower end of the sleeve 1 and projects therefrom with the open side adjacent one side of the connecting rod. For supporting the race ring 66, a closed bracket 67 of elongated conformation is utilized. The length of the bracket 67 is similar to the diameter of the sleeve to which it is secured at the ends in any suitable manner, as by welding. The inside width or clearance in the bracket 67 is sufficient to freely receive the connecting rod 59 and the race ring 66, the latter being attached to the inside surface of the side of the bracket as by welding. The open side of the channel cross section of the ring 66 is turned toward the connecting rod 59 and receives a pin 69 which projects therein from the side of the connecting rod. The pin is secured firmly to the connecting rod by having a suitable head 71 to fit into one side of the I cross section of the connecting rod 59 wherein it is attached, as by welding.

The opposite side of the connecting rod may slide against the other side of the bracket 67 serving as an alignment guide. The diameter of the race ring 66 is so selected with regard to the position of the pin 69 on the connecting rod that the ring is a composite of the lines created by the rotation and movement of the pin on the connecting rod during the travel of the connecting rod and the sleeve in one cycle of operation. In this manner by spacing the pin 69 on the connecting rod 59 at a proper distance from the piston, and providing a race ring 66 of a properly selected diameter, a compact driving mechanism is provided and the reciprocating sleeve 1 travels in the same direction as the piston, at a reduced velocity.

Preferably this friction sleeve operating mechanism is so designed that the sleeve travels at substantially one half the piston speed and travels one half the distance of the piston stroke. In such an arrangement, the length of the sleeve being equal to the length of a piston plus half a piston stroke, the sleeve is so actuated that the upper ends of the sleeve and piston will be even at the top of the stroke and the lower ends will be even at the bottom of the stroke. If desired, the pin 69 may be made smaller in diameter and provided with a roller ring or sleeve thereon to engage the race ring and reduce friction therebetween.

In this manner the wear and friction reducing sleeve 1 is operated at half the velocity relative to either the piston or the cylinder bore as compared with the relative rubbing speed of engagement that would exist if the piston operated directly in the cylinder bore. Because the total wear and friction losses vary as some high function of the relative rubbing speeds, and not directly, this results in a substantial savings especially at high speeds. Valves 73 actuated from a cam shaft 75 control the admission and discharge of combustible gases and exhaust gases in a well known manner. The upper ends of the cylinder bores are closed by cylinder heads 77 which are provided with spark plugs (not shown) for firing the charges received in a well known manner.

Although the arrangement of the race ring 66 and the pin 69 for driving the friction reducing sleeve 1 is shown and described in a V-type of engine, it may also be advantageously utilized in other types of engines, such as shown in Fig. 1, or in air compressors or the like and is especially useful wherever the assembly is very compact. Although for clearness and simplicity my wear and friction reducing sleeve has only been shown as installed in one or two cylinders, it is to be understood that all the cylinders of any multi-cylinder engine of straight, opposed, radial, V or other types may be similarly provided with the reciprocating sleeves.

It is apparent that within the scope of the invention, modifications and different arrangements may be made other than herein disclosed, and the present disclosure is illustrative merely, the invention comprehending variations thereof.

I claim:

1. In combination, a cylinder block, a bore in said block, a crank shaft rotatively journalled adjacent one end of the bore in said block, a piston slidable in said bore, a connecting rod connected between said piston and said crank shaft, said piston being of a smaller diameter than said bore for providing a space therebetween, a friction reducing sleeve of a suitable diameter and thickness disposed for sliding between the piston and the side walls of said bore, a race ring secured to said sleeve and extending therefrom adjacent the side of said connecting rod, a pin secured to and projecting from the side of said connecting rod into said race ring, and said pin and race ring being suitably positioned to cooperate for sliding said sleeve back and forth in said bore simultaneously with the same direction of movement as said piston but with a substantially slower average velocity and a shorter distance of movement.

2. A two-cycle internal combustion engine having in combination, a cylinder block, a bore in said block, a crank shaft rotatively journalled adjacent one end of the bore in said block, a piston slidable in said bore, a connecting rod connected between said piston and said crank shaft, said piston being of a smaller diameter than said bore for providing a space therebetween, a friction reducing sleeve substantially longer than the piston and of a suitable diameter and thickness for sliding between the piston and the sidewalls of said bore, sleeve driving means for moving said sleeve simultaneously with the piston in either direction of movement but at a slower average speed relative to the side walls of the bore and so that the upper ends of the sleeve and piston are substantially even at the bottom stroke, an intake port opening through the side wall of the cylinder bore at a point adjacent the mid-point of the sweep cleared by the upper end of the piston and at a point above the upper end of the sleeve when moved to its lowest position, an exhaust port opening through the side wall of the cylinder bore at a point just above the lowest position of the upper end of the piston, an exhaust port opening through the side of said sleeve at a point therein suitable for conductively connecting with the stationary exhaust port when the piston and the sleeve are moved to the lowest position in the cylinder bore, a source of gas under pressure, and conductive means connecting from said source to the intake port in the cylinder bore to inject gas therein to charge the cylinder and to aid in scavenging the cylinder when the piston and the sleeve are in the lowermost positions.

3. A two-cycle internal combustion engine having in combination, a cylinder block, a bore in said block, a crank shaft rotatively journalled adjacent one end of the bore in said block, a piston slidable in said bore, a connecting rod connected between said piston and said crank shaft, said piston being of a smaller diameter than said bore for providing a space therebetween, a friction reducing sleeve substantially equal in length to the piston plus half the piston stroke and of a suitable diameter and thickness and disposed for sliding between the piston and the side walls of said bore, sleeve driving means for moving said sleeve simultaneously with the piston in either direction of movement but at substantially half the average speed and so that the tops of the sleeve and the piston are substantially even at bottom stroke, an intake port opening through the side wall of the cylinder bore at a point adjacent the mid-point of the sweep cleared by the upper end of the piston and at a point above the upper end of the sleeve when moved to its lowest position, an exhaust port opening through the side wall of the cylinder bore at a point just above the lowest position of the upper end of the piston, and an exhaust port opening through the side of said sleeve at a point therein suitable for conductively connecting with the stationary exhaust port when the piston and 4. The combination with an internal combustion engine having cylinder blocks disposed in V-relations, cylinder bores in said cylinder blocks, a crank shaft journalled substantially at the apex of the V defined by said cylinder blocks, pistons of a smaller diameter than said bores and disposed to reciprocate therein, a friction reducing sleeve of a suitable diameter and thickness and disposed to slide between each piston and the side walls of its cylinder bore, a race ring secured to the end of each sleeve and extending therefrom adjacent the side of the associated connecting rod, a pin secured to and projecting from the side of the connecting rod into the race ring for moving each sleeve simultaneously with the piston in either same direction but with a slower velocity and through a shorter stroke.

5. The combination with an internal combustion engine having cylinder block means with cylinder bores disposed in V relation, a crank shaft journalled substantially at the apex of the V defined by the cylinder bores, of pistons of a smaller diameter than said bores and disposed to reciprocate therein, a connecting rod between each piston and the crank shaft, friction reducing sleeves substantially longer than the pistons and of a suitable diameter and thickness to slide between each piston and the side walls of its cylinder bore, a race ring secured to the lower end of each sleeve and extending therefrom adjacent the side of the associated connecting rod, said race ring being of channel cross section opening toward the adjacent connecting rod, a pin secured to and projecting from the side of each connecting rod into the adjacent race ring, and said pin being suitably positioned on the connecting rod and the race ring being selected of a suitable diameter to cooperate with the pin for moving the sleeve simultaneously with the piston in either direction and through a shorter stroke at a slower speed.

6. The combination with an internal combustion engine having cylinder block means with cylinder bores disposed in V relation, a crank shaft journalled substantially at the apex of the V defined by the cylinder bores, of pistons of a smaller diameter than said bores and disposed to reciprocate therein, a connecting rod joining from each piston to the crank shaft, friction reducing sleeves substantially longer than the piston and of a suitable diameter and thickness to slide between each piston and the side walls of its cylinder bore, each sleeve being of a length equal to substantially the length of a piston plus half a piston stroke, a race ring secured to the lower end of each sleeve and extending therefrom adjacent the side of the associated connecting rod, said race ring being of channel cross section opening toward the adjacent connecting rod, a pin secured to and projecting from the side of each connecting rod into the adjacent race ring, and said pin being suitably positioned on the connecting rod and the race ring being selected of a suitable diameter to cooperate with the pin for moving the sleeve simultaneously with the piston in either direction through approximately half a piston stroke and at a slower speed approximately equal to half piston speed.

7. In combination, a cylinder block, a bore in said block, a crank shaft rotatively journalled adjacent one end of the bore in said block, a piston disposed reciprocatably in said bore in spaced relation from the sidewalls thereof, a connecting rod operatively connecting the piston to the crank shaft, a friction reducing sleeve of a straight cylindrical outer conformation and of a suitable diameter and thickness disposed for sliding between said piston and the sidewalls of said bore, sleeve driving means for moving said sleeve simultaneously with the piston in the same direction of movement but at slower average speeds relative to the side walls of the bore, bracket means secured to the opposite edges of the end of said sleeve adjacent the crank shaft and extending across the end of the sleeve, and connecting means operatively connecting between said bracket and said sleeve driving means.

8. The combination according to claim 1, and further characterized by having bracket means secured to the opposite edges of the end of said sleeve adjacent the crank shaft and extending across the end of the sleeve, and said race ring being attached to said bracket means for driving the sleeve.

9. A two-cycle internal combustion engine comprising the combination according to claim 1 and further characterized by the fact that the sleeve has a length which is approximately equal to the length of the piston plus half of the piston stroke, the side wall of the cylinder bore has an intake port at a point adjacent the mid-point of the sweep cleared by the upper end of the piston and at a point above the upper end of the sleeve when moved to its lowest position, an exhaust port opening through the side wall of the cylinder bore at a point just below the lowest position of the upper end of the piston, and an exhaust port opening through the side of said sleeve at a point for conductively connecting with the stationary exhaust port when the piston and the sleeve are moved to the lowest position in the cylinder bore.

HENRY W. LINDENMUTH.